US010288423B2

(12) United States Patent
Pearcey

(10) Patent No.: US 10,288,423 B2
(45) Date of Patent: May 14, 2019

(54) MEASURING APPARATUS FOR DETERMINING DISTANCES TO POINTS ON A REFLECTIVE SURFACE COATED WITH METAL AND METHOD FOR SAME

(71) Applicant: HATCH PTY LTD, Perth, Western Australia (AU)

(72) Inventor: Owen Pearcey, Highvale (AU)

(73) Assignee: HATCH LTD., Mississauga (CA)

( * ) Notice: Subject to any disclaimer, the term of this patent is extended or adjusted under 35 U.S.C. 154(b) by 393 days.

(21) Appl. No.: 15/102,596

(22) PCT Filed: Dec. 9, 2014

(86) PCT No.: PCT/AU2014/001108
§ 371 (c)(1),
(2) Date: Jun. 8, 2016

(87) PCT Pub. No.: WO2015/085347
PCT Pub. Date: Jun. 18, 2015

(65) Prior Publication Data
US 2016/0313117 A1    Oct. 27, 2016

(30) Foreign Application Priority Data
Dec. 9, 2013   (AU) .............................. 2013904786

(51) Int. Cl.
*G01C 3/02* (2006.01)
*C23C 2/20* (2006.01)
(Continued)

(52) U.S. Cl.
CPC .............. *G01C 3/02* (2013.01); *C23C 2/003* (2013.01); *C23C 2/20* (2013.01); *G01B 11/026* (2013.01); *G01B 11/0683* (2013.01)

(58) Field of Classification Search
CPC ......... C23C 2/003; C23C 2/20; G01B 11/026; G01B 11/068; G01C 3/02
See application file for complete search history.

(56) References Cited

U.S. PATENT DOCUMENTS 6,449,041 B1   9/2002  Jung et al.
2003/0022400 A1*  1/2003  Nomoto ............... B24B 37/013
                                                   438/14
(Continued)

FOREIGN PATENT DOCUMENTS

EP    0452665 A2   10/1991
EP    1429297 A1   6/2004

OTHER PUBLICATIONS

International Search Report and Written Opinion of the ISA for PCT/AU2014/001108, ISA/AU, dated Feb. 2, 2015.

*Primary Examiner* — Eric L Bolda
(74) *Attorney, Agent, or Firm* — Borden Ladner Gervais LLP; Brandon L. Evenson

(57) ABSTRACT

A measuring apparatus, for measuring the distance to a surface having fluctuating reflectivity, the measuring apparatus comprising, a measuring light source and sensor unit positioned at an angle to the perpendicular of the surface to allow the light to be reflected to a diffuse target surface in a known position; and a processor unit, wherein the processor unit is adapted to collect and analyze data from the a measuring light source and sensor unit and classify whether the reading of the measuring light source and sensor unit is a direct reading or a reflected reading.

25 Claims, 6 Drawing Sheets

(51) Int. Cl.
*G01B 11/06* (2006.01)
*G01B 11/02* (2006.01)
*C23C 2/00* (2006.01)

(56) References Cited

U.S. PATENT DOCUMENTS

| | | | | |
|---|---|---|---|---|
| 2003/0227635 | A1* | 12/2003 | Muller | G01B 11/026 356/614 |
| 2010/0277748 | A1* | 11/2010 | Potapenko | G01B 11/026 356/623 |

* cited by examiner

MEASURING APPARATUS FOR DETERMINING DISTANCES TO POINTS ON A REFLECTIVE SURFACE COATED WITH METAL AND METHOD FOR SAME

CROSS-REFERENCE TO RELATED APPLICATIONS

This application is a 371 U. S. National Stage of International Application No. PCT/AU2014/001108, filed on Dec. 9, 2014 and claims priority to Australian Patent Application No. 2013904786, filed Dec. 9, 2013. The entire disclosures of the above applications are incorporated herein by reference.

TECHNICAL FIELD

The present apparatus relates to a measuring apparatus and method for same. More particularly, the apparatus and associated method of the present invention are intended for use in measuring the distance to a surface having fluctuating reflectiveness. More preferably, the apparatus of the present invention is intended to have particular application in continual coating processes.

BACKGROUND ART

The following discussion of the background art is intended to facilitate an understanding of the present invention only. The discussion is not an acknowledgement or admission that any of the material referred to is or was part of the common general knowledge as at the priority date of the application.

The use of laser rangefinders is known in a variety of industries. These devices use a laser beam to determine the distance to a diffuse object (otherwise known as "Time of Flight" measurement). The laser diode emits light pulses of about 35-45 nanoseconds, which hit the target and a small amount reflects off the target through diffuse scatter. This small amount of light is optically detected by a sensor and is amplified sufficiently to register in multiple circuits containing a high speed chronometer that measures the time it took for the light to return from the target. This is then translated into the distance to yield a range measurement. An alternative to Time of Flight measurement involves using a triangulation method of calculation. The triangulation laser shines a laser on the subject and exploits a camera to look for the location of the laser dot. The distance between the camera and the laser emitter is known. The angle of the laser emitter corner is also known. The angle of the camera corner can be determined by looking at the location of the laser dot in the camera's field of view. These three pieces of information fully determine the shape and size of the triangle and give the location of the laser dot corner of the triangle.

Difficulties arise however when the target is reflective, as the detector will fail to register a reading. This is because the laser is reflected directly off the reflective surface and so there is no dispersion of light when it hits a reflective surface, thus, a measurement can not be detected. By extension, if an object fluctuates between reflective and non-reflective, the detector will fluctuate between registering a reading, and registering nothing.

As an example, in conventional metal coating processes, a pair of opposed air knives are used to remove excess coating material from the strip/sheet of metal passing therebetween. In most circumstances, better control of the coating can be achieved when the air knife is close to the strip. However, minor buckling and trembling of the strip as it passes the air knife can cause the strip to hit the air knife, blocking it with the coating material, and resulting in poor coating consistency (or even damage to the strip). This results in the line having to be shut down to clear the air knife. Due to the requirement of small margins of error to adhere to industry specifications, inconsistent coating thickness and unexpected shutdowns can have a significant financial impact.

In order to avoid the aforementioned problems a number of solutions have been previously attempted. These typically involve complicated algorithms that utilise many control factors, such as strip velocity and air pressure to determine the strip distance. Due to the many constraints on the algorithms, these calculations have large margins for error and often result in erroneous strip distances being calculated. This is primarily due to the fact that they are numerical back-calculations. There is currently no real-time physical measurement available in the industry that covers the full range of equipment movement.

Other control methods have utilised a measurement of the distance between the air knife and the coated surface in order to identify and correct for when the strip is too close to the air knife. These have typically utilised either ultrasonic or induction sensors. However, ultrasonic sensors can fail to report a distance when used on very hot surfaces, and induction sensors have a limited range and do not cover the full scope of operating conditions.

Alternatively, lasers have been selected to measure the distance. However the lasers must be arranged to either measure the distance to a reflective surface only, or a non-reflective surface, only. As the strip moves past the knife, the coated surface will often be molten, and thus is reflective, but there are times in which the coating will solidify resulting in a matte, non-reflective surface. This results in inconsistent and incomplete data. To date, lasers have not been able to be used on both reflective and non-reflective surfaces interchangeably.

The present invention seeks to overcome, or at least ameliorate, one or more of the deficiencies of the prior art mentioned above, or to provide the consumer with a useful or commercial choice.

Throughout this specification, unless the context requires otherwise, the word "comprise" or variations such as "comprises" or "comprising", will be understood to imply the inclusion of a stated integer or group of integers but not the exclusion of any other integer or group of integers.

SUMMARY OF INVENTION

In accordance with one aspect of the present invention there is provided a measuring apparatus for measuring the distance to a surface having fluctuating reflectivity, the measuring apparatus comprising:
  a measuring light source and sensor unit positioned at an angle to the perpendicular of the surface to allow the light to be reflected to a diffuse target surface in a known position; and
  a processor unit,
wherein the processor unit is adapted to collect and analyse data from the measuring light source and classify whether the reading of the measuring light source and sensor unit is a direct reading or a reflected reading.

Preferably, the measuring apparatus further comprises:
  a reference light source and sensor unit positioned apart from the surface and directed at a reference target at a known position, wherein the processor unit is further adapted to collect and analyse data from the reference light source and sensor unit and thereby classify whether the reading of the measuring light source and sensor unit is a direct reading or a reflected reading.

Preferably, each of the light source and sensor units utilise laser, infra-red or LED light sources. More preferably, each of the light source and sensor units utilise laser light sources.

In one form of the present invention, the apparatus utilises two or more measuring light source and sensor units in a planar orientation spaced along the width of the surface.

Preferably, the apparatus utilises two reference light source and sensor units positioned on each side of the surface.

Preferably, the processor unit is any processor unit that is capable of calculating, such as a Programmable Logic Controller (PLC) or Programmable Controller (PC).

In one form of the present invention, each of the light source and sensor units are provided in single a protective housing.

In a preferred form of the present invention, the each of the light source and sensor units are provided behind a protective shield. Preferably, the protective shield is constructed of a diffuse material to provide the diffuse target surface. Still preferably, the protective shield may have a concave profile.

In accordance with a further aspect of the present invention there is provided a measuring apparatus for measuring the distance between an air knife and a coated strip surface during an air wiping process in which a strip of coated metal is passed between two opposed parallel air knives, the apparatus comprising:
 a measuring light source and sensor unit mounted on the air knife and positioned at an angle to the perpendicular of the coated strip surface to allow the light to be reflected to a diffuse target surface in a known position; and
 a processor unit,
wherein the processor unit is adapted to collect and analyse data from the measuring light source and classify whether the reading of the measuring light source and sensor unit is a direct reading or a reflected reading.

Preferably, the measuring apparatus further comprises:
 a reference light source and sensor unit positioned apart from the surface and directed at a reference target at a known position,
wherein the processor unit is further adapted to collect and analyse data from the reference light source and sensor unit and thereby classify whether the reading of the measuring light source and sensor unit is a direct reading or a reflected reading.

Preferably, each of the light source and sensor units utilise laser, infra-red or LED light sources. More preferably, each of the light source and sensor units utilise laser light sources.

In one form of the present invention, the apparatus utilises two or more measuring light source and sensor units in a planar orientation spaced along the width of the surface.

Preferably, the apparatus utilises two reference light source and sensor units positioned on each side of the surface.

Preferably, the processor unit is any processor unit that is capable of calculating, such as a Programmable Logic Controller (PLC) or Programmable Controller (PC).

In one form of the present invention, each of the light source and sensor units are provided in a single protective housing.

In a preferred form of the present invention, the each of the light source and sensor units are provided behind a protective shield. Preferably, the protective shield is constructed of a diffuse material to provide the diffuse target surface. Still preferably, the protective shield may have a concave profile.

In one form of the present invention, where the opposed air knives are capable of operating in a condition other than parallel, a second measuring light source and sensor unit is provided on the other air knife.

In accordance with a further aspect of the present invention there is provided a method for measuring the distance to a surface with fluctuating reflectivity, the method comprising the method steps of:
 taking a reading from a measuring light source and sensor unit positioned at an angle to the perpendicular of the surface to allow the light to be reflected to a diffuse target surface in a known position; and
 a processor unit adapted to collect and analyse the reading from the measuring light source classifies whether the reading of the measuring light source and sensor unit is a direct reading or a reflected reading.

Preferably, the method further comprises the step of:
 taking a reading from a reference light source and sensor unit positioned apart from the surface and directed at a reference target at a known position,
wherein the processor unit is further adapted to collect and analyse data from the reference light source and sensor unit and thereby classify whether the reading of the measuring light source and sensor unit is a direct reading or a reflected reading.

Preferably, each of the light source and sensor units utilise laser, infra-red or LED light sources. More preferably, each of the light source and sensor units utilise laser light sources.

Preferably, the processor unit is any processor unit that is capable of calculating, such as a Programmable Logic Controller (PLC) or Programmable Controller (PC).

In one form of the present invention, the method utilises the reading of two or more measuring light source and sensor units in a planar orientation spaced along the width of the surface.

Preferably, the methods utilises readings from two reference light source and sensor units positioned on each side of the surface.

In one form of the present invention, the comparison of the reading of the measuring light source and sensor unit and the reading of the reference light source and sensor unit.

In one form of the present invention, each of the light source and sensor units are provided in single a protective housing.

In a preferred form of the present invention, the each of the light source and sensor units are provided behind a protective shield. Preferably, the protective shield is constructed of a diffuse material to provide the diffuse target surface. Still preferably, the protective shield may have a concave profile.

In accordance with a further aspect of the present invention there is provided a method for measuring the distance between an air knife and a coated strip surface during an air wiping process in which a strip of coated metal is passed between two opposed parallel air knives, the method comprising the method steps of
 taking a reading from a measuring light source and sensor unit positioned at an angle to the perpendicular of the surface to allow the light to be reflected to a diffuse target surface in a known position; and a processor unit adapted to collect and analyse the reading from the measuring light source classifies whether the reading of the measuring light source and sensor unit is a direct reading or a reflected reading Preferably, the method further comprises the step of:

taking a reading from a reference light source and sensor unit positioned apart from the surface and directed at a reference target at a known position, wherein the processor unit is further adapted to collect and analyse data from the reference light source and sensor unit and thereby classify whether the reading of the measuring light source and sensor unit is a direct reading or a reflected reading.

Preferably, each of the light source and sensor units utilise laser, infra-red or LED light sources. More preferably, each of the light source and sensor units utilise laser light sources.

Preferably, the processor unit is any processor unit that is capable of calculating, such as a Programmable Logic Controller (PLC) or Programmable Controller (PC).

In one form of the present invention, the method utilises the reading of two or more measuring light source and sensor units in a planar orientation spaced along the width of the surface.

Preferably, the methods utilises readings from two reference light source and sensor units positioned on each side of the surface.

In one form of the present invention, the comparison of the reading of the measuring light source and sensor unit and the reading of the reference light source and sensor unit.

In one form of the present invention, each of the light source and sensor units are provided in single a protective housing.

In a preferred form of the present invention, the each of the light source and sensor units are provided behind a protective shield. Preferably, the protective shield is constructed of a diffuse material to provide the diffuse target surface. Still preferably, the protective shield may have a concave profile.

BRIEF DESCRIPTION OF THE DRAWINGS

Further features of the present invention are more fully described in the following description of several non-limiting embodiments thereof. This description is included solely for the purposes of exemplifying the present invention. It should not be understood as a restriction on the broad summary, disclosure or description of the invention as set out above. The description will be made with reference to the accompanying drawings in which.

DESCRIPTION OF EMBODIMENTS

Figure 1:
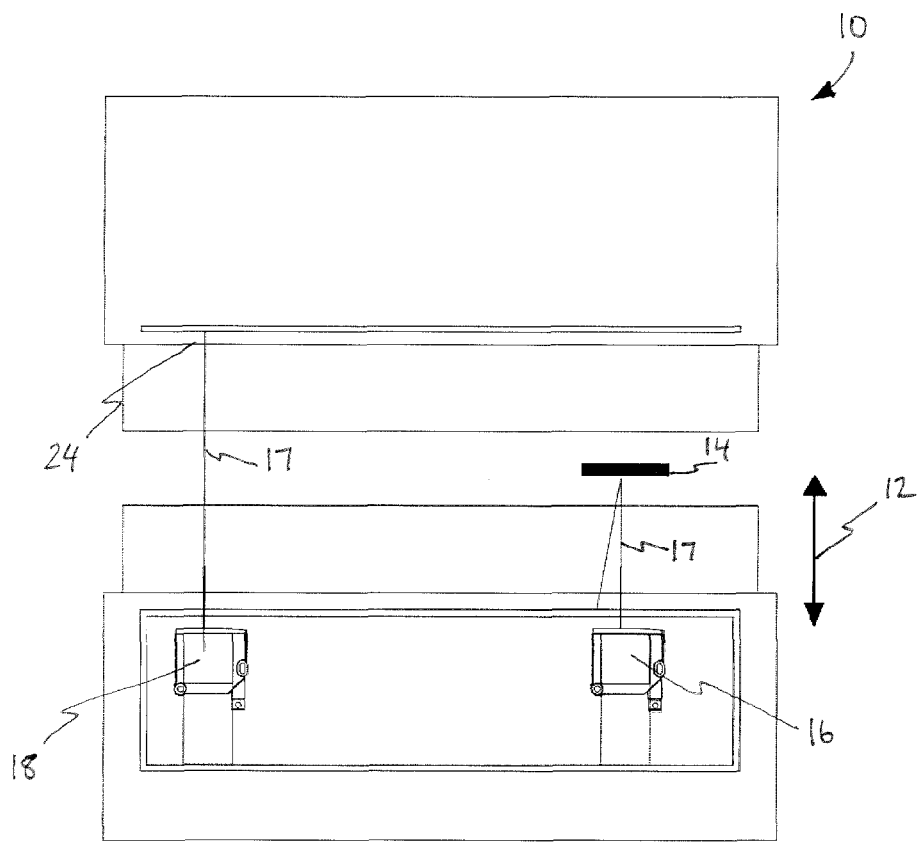
FIG. 1 is a plan view of a measuring apparatus in accordance with the present invention.
Figure 2:
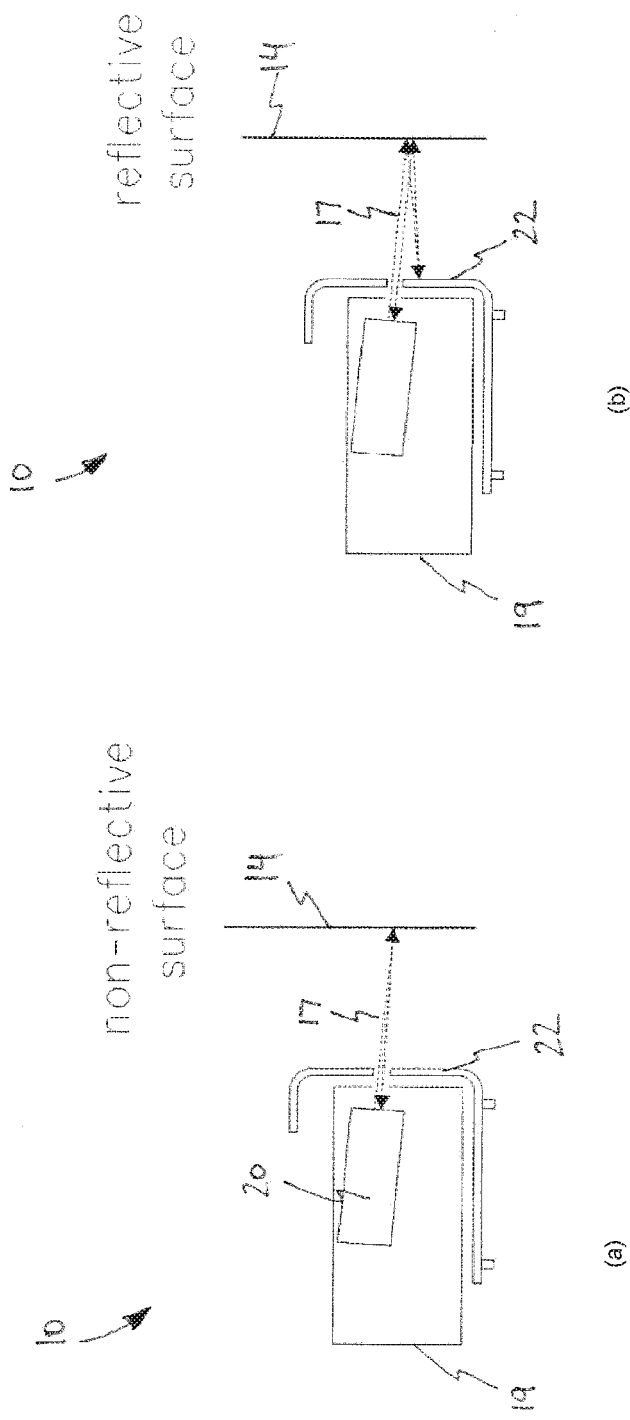
FIGS. 2a and 2b are side views of the measuring apparatus of FIG. 1 showing its operation on both non-reflective and reflective surfaces.

In FIGS. 1 and 2 there is shown an apparatus 10 for measuring the distance 12 to a surface 14 with fluctuating reflectivity. The apparatus 10 comprises a measuring light source and sensor unit 16 and a reference light source and sensor unit 18. Both the measuring light source and sensor unit 16 and a reference light source and sensor unit 18 utilise a laser beam 17 to determine the distance to the surface in known manners, such as pulse or triangulation methods. Both the measuring light source and sensor unit 16 and a reference light source and sensor unit 18 are provided in single protective housings 19. The light source 20 of the measuring light source and sensor unit 16 is positioned at an angle to the perpendicular of the surface 14 to allow the light to be reflected to a diffuse target surface, for example a protective shield 22. The reference light source and sensor unit 18 is directed towards a reference target 24.

The light source 20 of the measuring light source and sensor unit 16 can be positioned at any angle to the perpendicular of the surface 14 such as to allow for the light to be reflected off the surface 14 to point away from the light source 20.

As best seen in FIG. 2, the surface 14 can fluctuate between non-reflective (FIG. 2a) and reflective (FIG. 2b). In the case of a non-reflective surface 14, the reading of the measuring light source and sensor unit 16 will represent the distance between the measuring light source and sensor unit 16 and the target 14. In the case of a reflective surface 14, the distance measured by the reading of the measuring light source and sensor unit 16 will represent the distance between the unit and the target and back to the protective shield 22, or approximately twice the correct distance.

The measuring light source and sensor unit 16 and a reference light source and sensor unit 18 are positioned on the same plane, with the reference light source and sensor unit 18 at a position outside that of the surface 14. The surface 14 is spaced at an approximate centre of the distance between the reference light source and sensor unit 18 and the reference target 24. In this manner the reading of the measuring light source and sensor unit 16 can be compared to that of reference light source and sensor unit 18 in order to determine if the distance to the surface is correct or a double value caused by a reflective surface 14.

Figure 3:
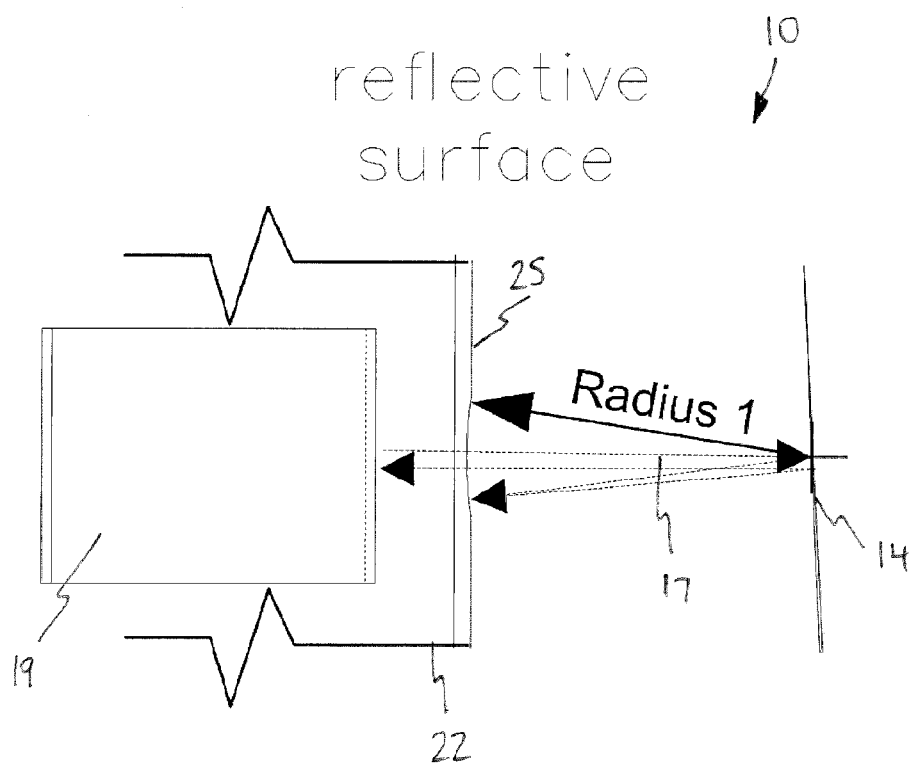
FIG. 3 is a plan view of the measuring apparatus of FIG. 1 shown utilising a concave proactive shield.

As shown in FIG. 3, the outer surface 25 of the protective shield 22 may have concave face. This allows for the measurement of surfaces that may have shifting alignments with respect to the measuring light source and sensor unit 16.

The data collected by the measuring light source and sensor unit 16 and a reference light source and sensor unit 18 are transferred to a processor unit (not shown). The processor unit is adapted to collect and analyse data from the measuring light source and sensor unit and the reference light source and sensor unit in order classify whether the reading of the measuring light source and sensor unit is a direct reading or a reflected reading, the process unit then calculates the real distance to the strip, in real time, from the reflected measurement.

The process unit is a Programmable Logic Controller (PLC) or Programmable Controller (PC) which allows for the computation of the data supplied by both the measuring light source and sensor unit 16 and a reference light source and sensor unit 18.

In the above manner the data generated by the apparatus of the present invention may be interpreted in real time by software in order to provide a complete set of continuous data.

Figure 4:
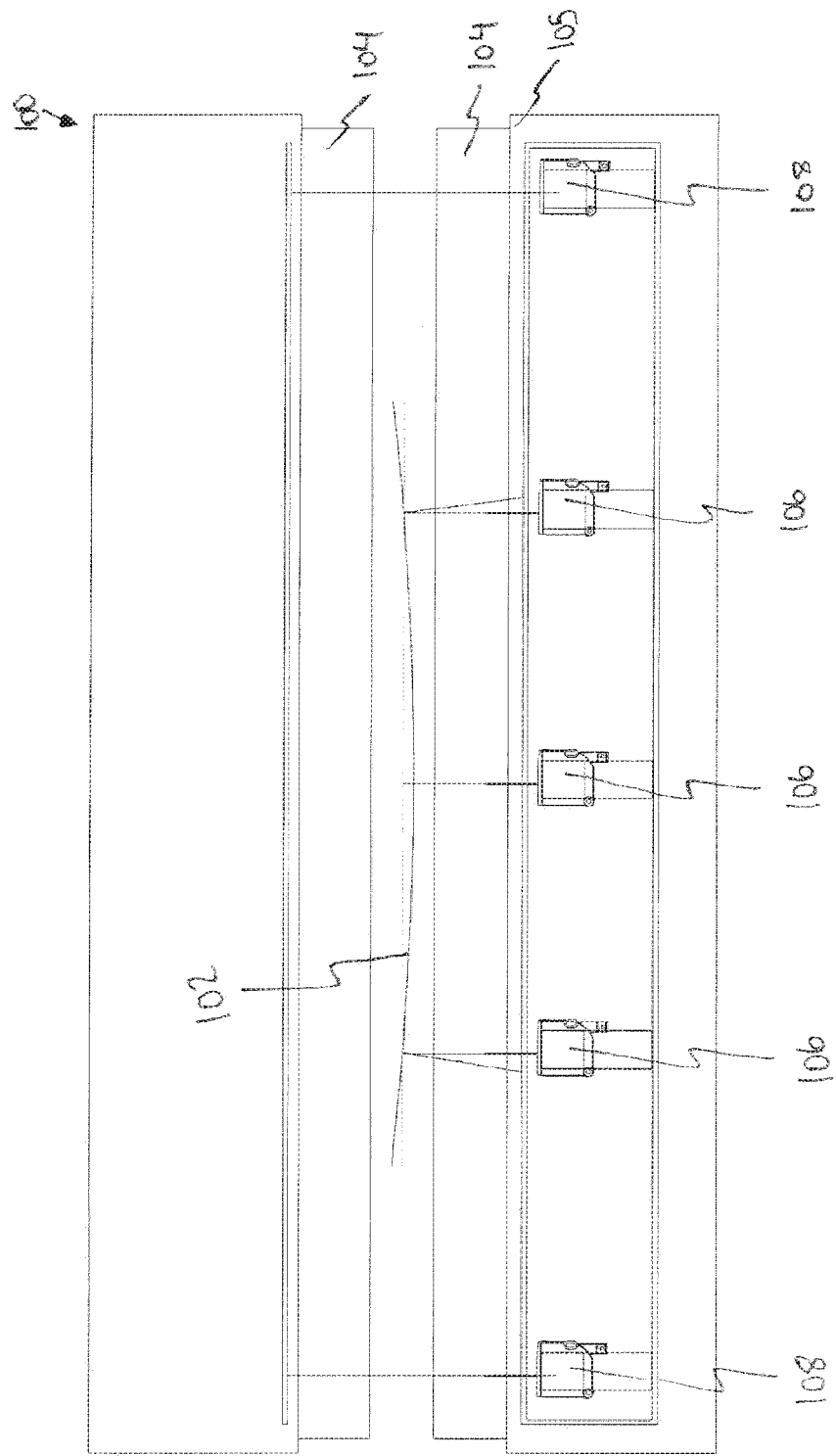
FIG. 4 is a front view of the measuring apparatus of FIG. 1 when used in a continuous coating apparatus.
Figure 5:
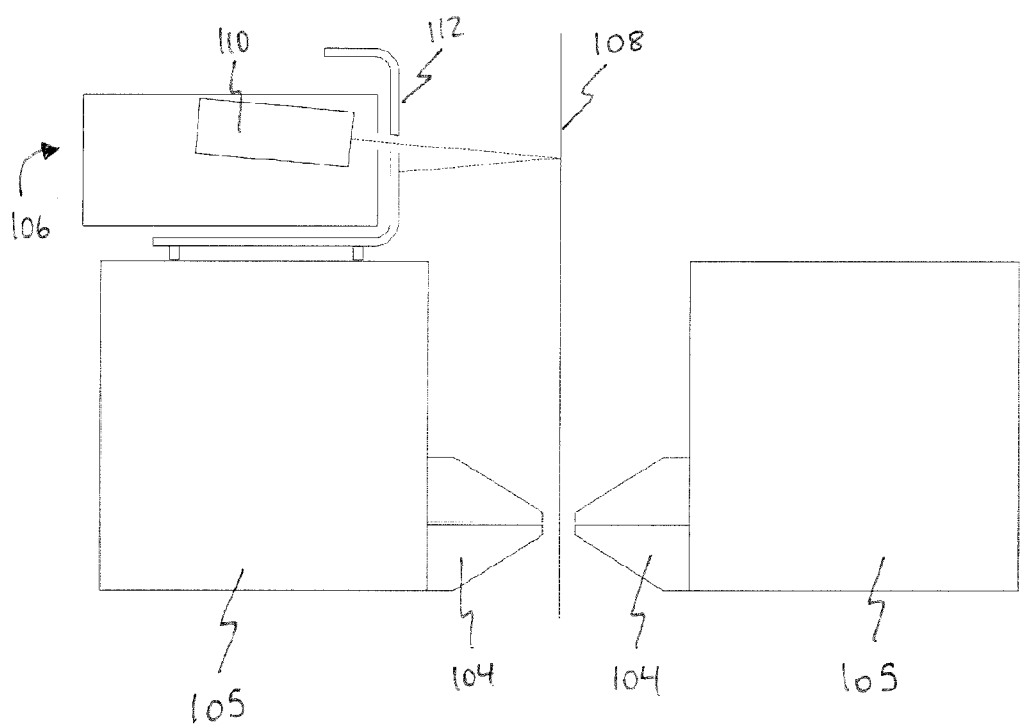
FIG. 5 is a side view of the measuring apparatus of FIG. 4.

As shown in FIGS. 4 and 5, the apparatus 10 of the present invention is particularly useful in a coating apparatus 100 used in continuous coating processes. In such a process a sheet 102 is continuously fed through a molten metal bath (not shown). This process is primarily used in the galvanisation of the metal. In such processes an air wiping process is used to remove excess metal from the surface of a steel substrate immediately after dipping, in the molten metal bath. In this manner the coated sheet 102 is passed between two opposed air knives 104. The air knives 104 are mounted on the coating apparatus on mounting portions 105. The air knives 104 direct air onto the coated sheet 102 to even out the coat and to direct excess coating material back into the bath.

The apparatus 100 comprises a measuring light source and sensor unit 106 and a reference light source and sensor unit 108. Both the measuring light source and sensor unit 106 and a reference light source and sensor unit 108 utilise a laser beam 17 to determine the distance to the sheet 102 in known manners, such as pulse or triangulation methods. The light source 110 of the measuring light source and sensor unit 106 is positioned at an angle to the perpendicular of the sheet of metal 102 to allow the light to be reflected to a diffuse target surface, for example a protective shield 112 in a known position.

The reference light source and sensor unit 108 is mounted outside of the widest available sheet 102 width, and is directed to the opposite air knife 104. In this manner a measurement can be made from air knife 104 to air knife 104.

The molten metal can be presented to the measuring light source and sensor unit 106 in either a molten or solidified form. This represents two very different surfaces that have to be measured. The reading of the measuring light source and sensor unit 106 will report one of two distances. A solidified surface will report the distance to the sheet of metal 102 and a molten metal surface distance reading will report a reflected measurement distance. By using the reference light source and sensor unit 108 outside of the widest available strip width, a measurement can be made from air knife to air knife. The measuring light source and sensor unit 106 can be compared to the reference light source and sensor unit 108 measurements and classified into direct measurements or reflected measurements. The process unit then converts a reflected measurement to an actual distance to the strip in real time.

This comparison and classification allows the technique to cover all the operational conditions. Using one air knife 104 to air knife 104 measurement is sufficient if the air knives 104 are going to remain parallel through the operation of the line. Two reference light source and sensor units 108 can be used if the air knives 104 are capable of operating in a condition other than parallel.

As best seen in FIG. 4, three measuring light source and sensor units 106 are provided in a planar array. This provides a measurement of the distance between the air knives 104 at the centre of the sheet 102 and the out peripheries. A comparison of these distances can be made to measure the about of bowing that occurs along the sheet. This typically results in an uneven coating being applied to the metal sheet 102. The additional information obtained from the measurement system will allow improved process strategies to be developed, for example, changing tension and roll induced strip defects.

Additionally, strip stabilization systems have been added to many coating processes. The apparatus of the present invention will allow their effectiveness to be measured and stabilization equipment optimization strategies created.

It is understood that a reading is obtained when the strip is reflective, due to the angled position of the laser beam 17 to the strip. Thus, a measurement can still be obtained in the absence of a reference measurement. However, a reference measurement allows determination of the actual distance from both a front air knife to the strip as well as the distance from the rear air knife to the strip, in real time, without the need for the mounting of detection devices on both sides of the coating apparatus.

Closer operating distance of the air knife will enable existing machinery to be suitable for use with modern coating compositions. These modern compositions require a smaller air knife to strip distances, and are more prone to the damaging/clogging the air knife. Knowledge of the air knife to strip distances will allow protection strategies be installed to prevent the strip and air knife clashing.

Analysis of the air knife to strip distance data will allow the early detection of bearing related problems. The measurement results can be analysed for roll bearing related harmonics Other advantages of the present invention include the ability to overcome the weaknesses for current control technologies to handle slow speeds/heavy coat applications.

EXAMPLE

The present invention will now be described in further details with reference to the following example, relating to some embodiments of the invention. It will be understood that the invention is not limited to the embodiments provided by way of example.

Two distance measurement units were set up in the configuration described. First measurement is simulating measuring the distance from the front air knife to the rear air knife (Sensor 1 Distance) and the second is simulating measuring the distance from the first air knife to the target surface (Sensor 2 Distance). The initial target surface has a pale opaque surface, to simulate the solid surface. During the test a highly reflective mirror is introduced to simulate the effect of the liquid metallic surface. For the purposes of the test, the sensor units are setup so that the measurement range has a minimum output at 50 mm and a maximum output at 600 mm. For the trial, a standoff distance of 150 mm is simulated, effectively the distance from the start of the measurement range to the front of the air knives. If the air knife to target distance is zero, then the measurement sensors will report a distance of 150 mm. During the trial, the measurement is the 150 mm standoff distance plus the 24 mm machine to target distance which gives a sensor measurement distance of approximately 174 mm to the target.

Figure 6:
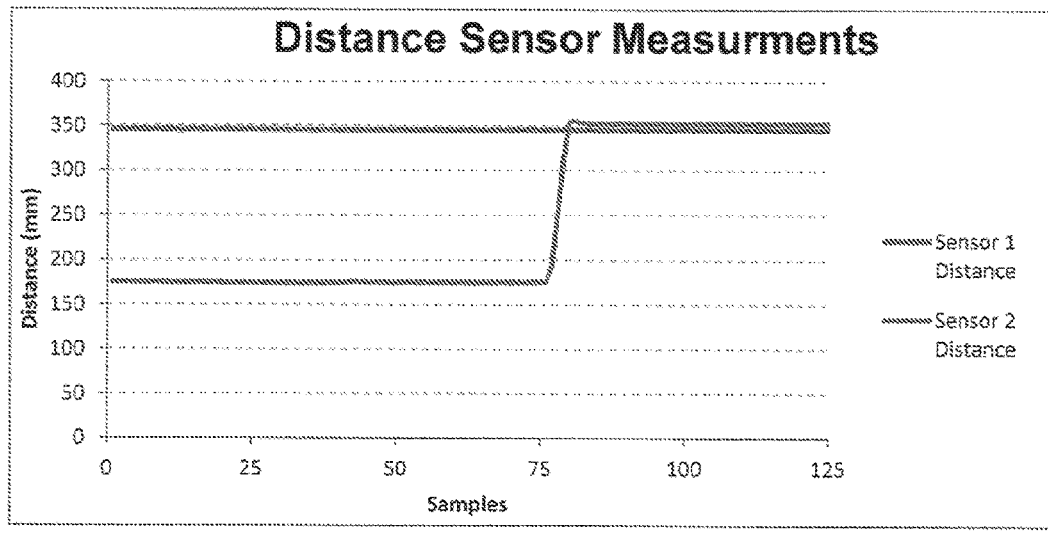
FIG. 6 is a graph of the distance sensor measurements recorded during an experimental trial.
Figure 7:
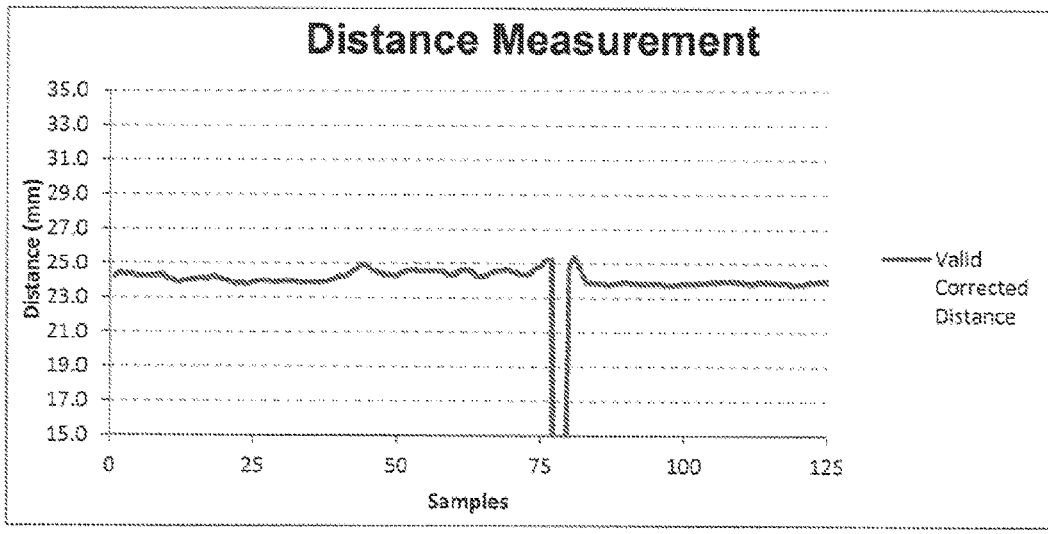
FIG. 7 is the corrected distance measurement for the results shown in FIG. 6.

As can be seen in FIG. 6, when the reflective target (mirror) is introduced, the measurement distance feedback from the second laser takes a longer path resulting in a larger distance being reported. Comparing the two measurements from Sensor 1 and Sensor 2, a corrected distance measurement may be calculated. The corrected results are shown in FIG. 7. As can be seen in FIG. 7, during the change over from a non-reflective surface to a reflective surface there are results which do match the distance expected for either a direct reading or a reflected reading. These are shown as invalid or zero-entries.

There is a disparity between the distance measurement of FIG. 6 and the final calculate difference in FIG. 7. This is a result of the difference between the start of the laser range and the front of the air knife. This is a fixed difference which is subtracted from the raw data taken from the measuring light source and sensor unit.

With knowledge of the target thickness, the distance from the rear air knife to the reverse face of the target can be similarly calculated.

Modifications and variations such as would be apparent to the skilled addressee are considered to fall within the scope of the present invention.

The invention claimed is:

1. An apparatus for determining distances to points on a reflective surface coated with a coating metal, the apparatus comprising:
    a diffuse surface comprising a concave face,
    a laser emitter configured to emit a laser beam at an angle to the perpendicular of the reflective surface for reflection off the reflective surface onto the concave face of the diffuse surface;
    a sensor configured to detect a diffuse light of the laser beam; and
    a processor configured to determine the distances to the points of reflection of the laser beam off the reflective surface based on readings from the sensor corresponding to the detected diffuse light.

2. The apparatus of claim 1, wherein the sensor is positioned to detect, from the reflective surface, a reflection of the diffuse light of the laser beam.

3. An apparatus for determining a distance to a metal-coated surface having fluctuating reflectivity, comprising:
    a laser emitter configured to emit a laser beam at the coated surface at an angle to the perpendicular of the coated surface;
    a sensor configured to detect a diffuse light of the laser beam from the coated surface; and
    a processor configured to determine the distance to the coated surface based on a reading from the sensor.

4. The apparatus of claim 3, wherein the processor is configured to determine the distance to be proportional to half the reading from the sensor in response classifying the reading as a reflected reading.

5. The apparatus of claim 3, wherein the processor is configured to classify the reading as a reflected reading in response to the reading being greater than a reference measurement.

6. The apparatus of claim 5, wherein the reference measurement is greater than the maximum distance at which the laser emitter can be located from the coated surface.

7. The apparatus of claim 5, wherein the reference measurement is based on a reading from a reference laser emitter and sensor unit.

8. The apparatus of claim 3, wherein, in response to the coated surface being reflective, the sensor is configured to detect from the coated surface a reflection of the diffuse light of the laser beam from a diffuse surface.

9. A system for controlling the thickness of a coating metal on a metal sheet in a coating process, comprising:
    an air knife configured to emit high-pressure air at a surface of the metal sheet after emerging from a bath of the coating metal;
    a laser rangefinder positioned to provide a laser beam at the surface at an angle to the perpendicular of the surface, and detect diffuse light of the laser beam; and
    a processor configured to cause a change to a distance between the air knife and the surface of the metal sheet in response to a distance reading of the laser rangefinder.

10. The system of claim 9, wherein the laser rangefinder is mounted relative to the air knife.

11. The system of claim 9, comprising a plurality of laser rangefinders positioned to determine the amount of bowing of the metal sheet.

12. The system of claim 9, wherein the laser rangefinder is positioned to reflect the laser beam off the surface onto a diffuse surface when the surface is reflective, and detect the diffuse light of the laser beam from the diffuse surface.

13. A method for coating a sheet of metal with a coating metal, comprising:
    applying the coating metal to the sheet;
    emitting, from an air knife a select distance from the sheet, high-pressure air at the sheet after applying the coating metal to reduce the thickness of the coating metal;
    directing a laser beam at an angle to the perpendicular of the sheet after applying the coating metal;
    detecting a diffuse light of the laser beam; and
    adjusting the select distance of the air knife from the sheet in response to the detected diffuse light of the laser beam.

14. The method of claim 13, wherein detecting the diffuse light of the laser beam comprises, detecting, off the sheet of metal, a reflection of the diffuse light of the laser beam on a diffuse surface.

15. The method of claim 13, wherein the laser beam reflects off the sheet onto a diffuse surface to produce the diffuse light in response to the coating metal on the sheet being reflective, and the laser beam produces the diffuse light off the sheet in response to the coating metal on the sheet being matte.

16. The method of claim 13, further comprising classifying the detected diffuse light as a direct reading or reflected reading, and adjusting the selected distance of the air knife in response to the classification.

17. The method of claim 16, wherein the detected diffuse light is classified as a reflected reading in response to determining that the detected diffuse light travelled a distance greater than a reference measurement.

18. A method for determining a distance to a surface of a sheet having fluctuating reflectivity, comprising:
    directing a laser beam at the surface at an angle to the perpendicular of the sheet;
    detecting, from the surface, a diffuse light of the laser beam; and
    determining the distance to the surface based on the detected diffuse light and a reference distance measurement.

19. The method of claim 18, wherein detecting the diffuse light comprises detecting from the surface a reflection of the diffuse light of the laser beam on a diffuse surface when the surface is reflective, and detecting from the surface the diffuse light of the laser beam on the surface when the surface is non-reflective.

20. The method of claim 18, wherein determining the distance comprises determining the distance to be proportional to half of an actual distance travelled by the light of the laser beam in response to the actual distance being greater than the reference distance measurement, and determining the distance to be proportional to the actual distance travelled by the light of the laser beam in response to the actual distance being less than the reference distance measurement.

21. The apparatus of claim 3, wherein the processor is configured to determine the distance based on the reading and a reference measurement.

22. The apparatus of claim 3, wherein the processor is configured to classify the reading as a direct reading or a reflected reading and determine the distance based on the classification.

23. The apparatus of claim 3, wherein the processor is configured to determine the distance to be proportional to half the reading from the sensor in response to the reading being greater than a reference measurement, and the processor is configured to determine the distance to be proportional to the reading from the sensor in response to the reading being less than a reference measurement.

24. The method of claim 13, wherein applying the coating metal comprises passing the sheet of metal through a molten bath of the coating metal.

25. The method of claim 13, wherein directing the laser beam comprises directing the laser beam at the sheet at an angle to the perpendicular of the sheet.

\* \* \* \* \*